(12) United States Patent
Garg et al.

(10) Patent No.: US 11,539,769 B2
(45) Date of Patent: Dec. 27, 2022

(54) OPTIMIZING CONTENT STREAMING

(71) Applicant: T-Mobile USA, Inc., Bellevue, WA (US)

(72) Inventors: Parag Garg, Woodinville, WA (US); Nicholas LaVassar, Issaquah, WA (US); Nicholas Seitz, Seattle, WA (US); Teri Howe, Bothell, WA (US); Michael Burbo, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 20 days.

(21) Appl. No.: 16/935,859

(22) Filed: Jul. 22, 2020

(65) Prior Publication Data

US 2022/0030044 A1 Jan. 27, 2022

(51) Int. Cl.
*H04L 65/61* (2022.01)
*H04W 36/02* (2009.01)
*H04W 28/20* (2009.01)
*H04W 36/08* (2009.01)

(52) U.S. Cl.
CPC ............. *H04L 65/61* (2022.05); *H04W 28/20* (2013.01); *H04W 36/023* (2013.01); *H04W 36/08* (2013.01)

(58) Field of Classification Search
CPC .......................... H04L 65/4069; H04W 28/20; H04W 36/023; H04W 36/08; H04W 76/27

See application file for complete search history.

(56) References Cited

U.S. PATENT DOCUMENTS

| | | | |
|---|---|---|---|
| 8,086,234 B2 | 12/2011 | Paul et al. | |
| 8,406,763 B1 * | 3/2013 | Smith | H04W 36/16 |
| | | | 455/436 |
| 8,959,177 B1 | 2/2015 | Weston, Jr. et al. | |
| 11,252,214 B1 * | 2/2022 | Pawar | H04W 36/0016 |
| 2008/0141314 A1 | 6/2008 | Lemond et al. | |
| 2019/0281516 A1 | 9/2019 | Viox et al. | |
| 2020/0383008 A1 * | 12/2020 | Mallikarjunan | H04W 36/026 |
| 2021/0084582 A1 * | 3/2021 | Li | H04W 48/18 |
| 2021/0105682 A1 * | 4/2021 | Yadhav | H04L 67/148 |

* cited by examiner

*Primary Examiner* — Shukri Taha
(74) *Attorney, Agent, or Firm* — Han Santos, PLLC (57) ABSTRACT

Methods, systems, and apparatus, including computer programs encoded on a computer storage medium, for optimizing streaming content are disclosed. In one aspect, a method includes the actions of determining that a user device participating in a content streaming service will transition from a first wireless service coverage area to a second wireless service coverage area that provides a lower quality wireless service relative to the first wireless service coverage area. The actions further include, prior to the user device transitioning from the first wireless service coverage area to the second wireless service coverage area, increasing a resource associated with the content streaming service and the user device. The actions further include, after the user device transitions from the first wireless service coverage area to the second wireless service coverage area, decreasing the resource associated with the content streaming service and the user device.

16 Claims, 6 Drawing Sheets

610 Determine that a user device participating in a content streaming service will transition from a first wireless service coverage area to a second wireless service coverage area, the first wireless service coverage area being associated with a first plurality of content providers providing a first plurality of content items, the second wireless service coverage area being associated with a second plurality of content providers providing a second plurality of content items

620 Prior to the user device transitioning from the first wireless service coverage area to the second wireless service coverage area, determine a matching content item in the second plurality of content items that matches a first content item from the first plurality of content items that is currently streaming to the user device, the matching content item being provided by a second content provider of the second plurality of content providers different from a first content provider of the first plurality of content providers that is providing the first content item

630 After the user device transitions from the first wireless service coverage area to the second wireless service coverage area, cause the matching content item to become the content item that is currently streaming to the user device

FIG. 6

OPTIMIZING CONTENT STREAMING

BACKGROUND

Streaming media is audio, video, or another type of content that is constantly received by and presented to a user while being delivered by a provider. Streaming an item of media content is an alternative to downloading media content before watching or listening to it.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

As a user travels from place to place, the user may cross between wireless service coverage areas. Different wireless coverage areas may provide different qualities of service, and content availability may differ in different coverage regions. If a user is streaming content and crosses from one wireless coverage to another, then the user may experience a disruption in the content streaming experience. Measures can be taken to optimize a user's content streaming experience when the user crosses from one wireless service coverage area to another.

A wireless network system may predict that a user will cross a wireless service coverage boundary. The prediction may be based on various factors. For example, the wireless network system may signal an upcoming coverage boundary crossing. The user's physical trajectory may be used to predict an upcoming coverage boundary crossing based on aggregate and/or personal historical traffic patterns. The wireless network system can use long term movement patterns such as over days, weeks, months, etc., to predict an upcoming coverage boundary crossing. To optimize the user's content streaming experience during a coverage boundary crossing, several actions can be taken prior to the boundary crossing.

When the predicted coverage boundary crossing is from a higher quality wireless service coverage area to a lower quality wireless service coverage area, the user may be temporarily given higher priority access to resources in the period before the transition, for example, a bit rate increase and/or an increase in on-device steaming content buffer size. In some instances, content may be relocated within the network to geographical locations closer to the user's predicted wireless service coverage area, such as to a particular tower-based station.

At times, wireless service coverage area boundaries may correspond to boundaries between streaming services, for example, international or other regulatory boundaries. Often different regions require different digital rights management (DRM) certificates. In response to the predicted coverage boundary crossing, the wireless network system can automatically obtain DRM certificates that may be required post-transition, including "offline" certificates.

In some instances, streaming services may offer different content in different coverage areas. For example, a streaming service may offer different content in different countries. To optimize a user's content streaming experience, a new streaming service may be identified in a new coverage area that provides identical content. Alternatively, or in addition, a streaming service may be identified that provides a localized version of the streaming content. Where identical content is not available, the wireless network system may identify a most relevant content. Where the most relevant content is provided by several providers, the wireless network system may identify an optimal provider (e.g., based on streaming quality characteristics and/or cost).

Figure 1:
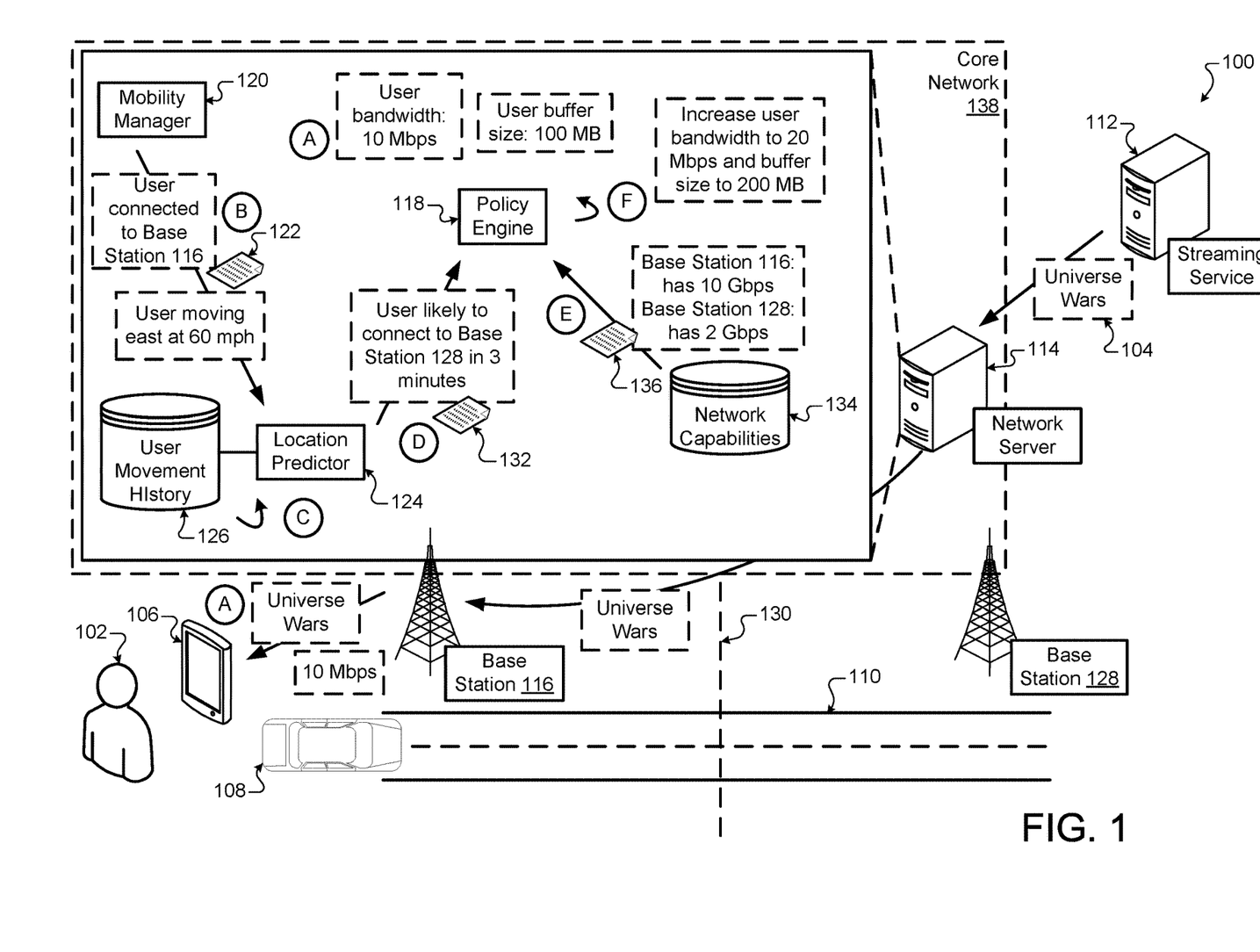
FIG. 1 illustrates an example system for delivering streaming content while a user is moving from a higher quality wireless network coverage area to a lower quality wireless network coverage area.

FIG. 1 illustrates an example system 100 for delivering streaming content while a user is moving from a higher quality wireless network coverage area to a lower quality wireless network coverage area. Briefly, and as described in more detail below, the user 102 is streaming video content 104 on the user device 106 while riding in the car 108. Before the user 102 moves from a higher quality wireless service coverage area to a lower quality wireless service coverage area, the network server 114 adjusts the resources used to stream the video content to increase the quality of service that the network server 114 would have provided when streaming video content in the lower quality wireless service coverage area if the network server 114 did not adjust the resources.

In more detail and in stage A, the user 102 is streaming video content 104 while traveling along road 110 in the car 108. The streaming service 112 provides the video content 104 to the network server 114, and the network server 114 provides the video content 104 to the base station 116. The base station 116 provides wireless network connectivity to a first wireless service coverage area. With the user 102 and the user device 106 in the first wireless service coverage area, the user device 106 receives the streaming video content from the base station 116. The user device 106 may be any type of device that is capable of receiving and outputting streaming content such as a phone, tablet, laptop, wearable device, or any other similar type of device.

Based on the network capacity of the base station 116, the bandwidth required to stream the video content 104 to the user device 106, the characteristics of the user device 106, and any other similar factors, the policy engine 118 of the network server 114 determines an appropriate bandwidth base station 116 to provide the video content 104 to the user device 106 and an appropriate buffer size for the user device 106 to utilize for the video content 104. For example, the user 106 may be streaming the movie "Universe Wars" and the policy engine determines to provide the video content 104 at a rate ten megabits per second. Additionally, the network server 114 may instruct the user device 106 to utilize a buffer of one hundred megabytes. Using this level of resources, the user 102 may be able to enjoy the video content 106 at HD quality.

The network server 114 may be included in a wireless carrier network that provides voice and data communication services to multiple user devices, such as the user device 106. The wireless carrier network may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or other similar standards.

The wireless carrier network may include a radio access network and a core network 138. The network server 114 may be included in the core network 148. The radio access network may include multiple base stations, such as base station 116. The multiple base stations are responsible for handling voice and data traffic between multiple user devices, such as the user device 106, and the core network 138. Accordingly, each of the base stations may provide a corresponding network cell that delivers telecommunication and data communication coverage. The core network 138 may use the network cells to provide communication services to the multiple subscriber devices. For example, the core network 138 may connect the multiple subscriber devices to other telecommunication and data communication networks, such as the Internet and the public switched telephone network (PSTN). The base stations are responsible for handling voice and data traffic between user devices and the core network 138. In some implementations, the base stations may be in the form of eNodeB nodes. Each eNodeB node may include a base transceiver system (BTS) that communicates via an antenna system over an air-link with one or more user devices that are within range. The antenna system of an eNodeB node may include multiple antennas that are mounted on a radio tower to provide a coverage area that is referred to as a "cell." The BTS may send RF signals to user devices and receive radio signals from subscriber devices.

In some implementations, the base station 116 and the base station 128 are part of separate wireless carrier networks. A first wireless carrier network may include the core network 138 and a radio access network that includes the base station 116. A second wireless carrier network may include a different core network and a different radio access network that includes the base station 128. In some implementations, the base station 116 and the base station 128 are part of the same wireless carrier network. The wireless carrier network includes the core network 138 and a radio access network that includes the base station 116 and the base station 128.

As noted above, the user is streaming the video content 104 while traveling along the road 110 in the car 108. The network server 114 includes a mobility manager 120 that monitors the movement of the user devices connected to the network server 114. The mobility manager 120 may be software or executable instructions embodied in computer-readable media included in or accessible by the network server 114. The mobility manager 120 may determine a location of the user device 106, the movement of the user device 106, the base station that the user device 106 is connected to, and any other similar location or movement related data. For example, the mobility manager 120 may determine that the user device 106 is connected to base station 116 and is moving east at sixty miles per hour.

The mobility manager 120 may determine the movement, including the speed and trajectory, of the user device 106 in several different ways. In some implementations, the mobility manager 120 may receive GPS data from the user device 106 at periodic intervals, such as every second. The mobility manager 120 may determine the movement of the user device 106 based on the last several GPS readings. In some implementations, the mobility manager 120 may request GPS data from the user device 106 based a change in signal strength between the base station 116 and the user device 106. If the signal strength changes by at least a signal strength threshold, then the mobility manager 120 may request GPS data from the user device 106. In some implementations, the mobility manager may determine the movement of the user device based on beamforming parameters used by the base station 116 when connected to the user device 106 and/or signal strength between the base station 116 and the user device 106.

In stage B, the mobility manager 120 provides the movement data 122 to the location predictor 124 of network server 114. For example, the mobility manager 120 provides the movement data 122 that indicates that the use device 106 is connected to the base station 116, and the user device 106 is moving east at sixty miles per hour. The location predictor 124 may be software or executable instructions embodied in computer-readable media included in or accessible by the network server 114.

In stage C, the location predictor 124 determines likely location(s) and/or base station(s) that the user device is going to be and/or connect to in the future based on the user movement history 126, the movement data 122, base station locations, and other similar information. In some implementations, the location predictor 124 analyzes the past speed and trajectory of the user device 106 and determines the user device 106 is likely to continue traveling in that same trajectory at approximately the same speed. Based on the base station locations, the location predictor 124 determine when the user device 106 is likely to cross the boundary 130 between one wireless service coverage area and an adjacent wireless service coverage area and connect to a base station 128 of an adjacent wireless service coverage area. For example, the location predictor 124 may determine that the user device 106 is likely to connect to base station 128 in three minutes.

In some implementations, the location predictor 124 may access map data. Based on the movement data 122 and map data, the location predictor 124 may determine a road 110 along which the user device 106 is moving. Based on the characteristics of the road 110 and the points of interest along the road 110, the location predictor 124 may determine that the user device 106 is likely to continue traveling along that same road 110. The location predictor 124 may determine an approximate time at which the user device will cross the boundary 130 wireless service coverage areas. The characteristics of the road 110 may include the type of road (e.g., limited access highway, divided highway, undivided highway, primary road, secondary road), the speed limit, the number of intersections, and other similar characteristics. If a user device 106 is moving along a secondary road in the direction of an entry point to a limited access highway, the location predictor 124 may predict that the user device 106 will likely enter the limited access highway. The points of interest along the road may include cities, towns, businesses, and other similar points of interest. If the user device is moving along a road that intersects with another road that leads towards a point of interest, such as a theme park, and there are no significant points of interest after the intersection, then the location predictor 124 may predict that the user device will likely move along the intersecting road towards the theme park. In some implementations, the location predictor 124 may analyze only the characteristics of the road 110 and the points of interest along the road 110 within the wireless service coverage area to which the user device 106 is connected.

In some implementations, the location predictor 124 may determine a likely future location of the user device 106 based on directions that the user device 106 or a nearby user device may be outputting. For example, the user 102 may have requested that a mapping application of the user device 106 or a nearby user device output directions to River City. Based on the user device 106 or the nearby user device outputting directions to River City, the location predictor 124 may determine that a likely future location is River City. The location predictor 124 may identify the nearby device based on the movement data 122 of the user device and the movement of the nearby device. If the movement of the user device 122 and the movement of the nearby device is sufficiently correlated, then the location predictor 124 may determine that the user device 106 may follow the same directions being output by the nearby device.

In some implementations, the location predictor 124 accesses the user movement history 126. This may include the movement of the user device 106 during the past day, week, month, etc. The location predictor 124 may analyze the user movement history 126 for movement patterns similar to the movement data 122. If the location predictor 124 identifies a similar movement pattern in the user movement history 126, then the location predictor 124 may determine that the likely movement of the user device 106 will follow the corresponding movement in the user movement history 126.

In some implementations, the location predictor 124 accesses movement history for other user devices. The location predictor 124 may perform a similar analysis of the movement history for other user devices that the location predictor 124 performed on the user movement history 126.

In some implementations, the location predictor 124 may be configured to initiate determining a likely future location and/or likely trajectory of the user device 106 in response to the user device 106 being within a threshold distance of a boundary 130 between wireless service coverage areas. For example, if the threshold distance is one mile, then the location predictor 124 may initiate predicting a location of the user device 106 and/or base station that the user device 106 will likely connect to in the future if the user device 106 is within one mile of the boundary 130 between wireless service coverage areas. If the user device 106 is two miles from the boundary 130, then the location predictor 124 may perform no action because it is not likely that the user device 106 will cross the boundary 130 in the near future.

In some implementations, the location predictor 124 may initiate determining a likely future location of the user device 106 when the signal strength between the user device and the base station 116 is below a threshold level. This may indicate that the user device 106 is near the boundary 130 of the wireless service coverage area.

In stage D, the location predictor 124 provides the policy engine 118 with prediction data 132 that indicates that the user device 106 is likely to connect to the base station 128 in three minutes. The location predictor 124 determined this prediction based on the movement data 122 received from the mobility manager 120, the user movement history 126, the locations of the base stations, and/or a map.

In stage E, the policy engine 118 accesses network capability data 136 from the network capabilities 134. The policy engine 118 may access network capability data 136 for the wireless service coverage area for base station 116 and the wireless service coverage area for base station 128 based on the user device 106 being currently connected to the base station 116 and the user device 106 likely going to connect to the base station 128. The network capabilities 134 may store information related to the capabilities of various base stations and the wireless service coverage area of each of those base stations. The capabilities may include the number of devices that can connect to the base station, the bandwidth available at that base station, the number of devices currently connected to the base station, the bandwidth currently consumed by the currently connected devices, and any other similar capabilities. In the example shown in FIG. 1, the policy engine 118 receives network capability data 136 that indicates that the base station 116 has a bandwidth of ten gigabits per second and the base station 128 has a bandwidth of two gigabits per second.

In stage F, the policy engine 118 analyzes the network capability data 136 in view of the user device 106 likely transitioning from being connected to base station 116 to base station 128 and the current activity of the user device 116, which is the user device 116 streaming the movie "Universe Wars" and consuming a bandwidth of ten megabits per second. The user device 116 is also utilizing a buffer of one hundred megabytes.

Based on the network capability data 136, the policy engine 118 determines that the wireless service coverage area of base station 128 is lower quality than the wireless service coverage area of base station 116. The policy engine 118 determines that, based on the network capability data 136 for the wireless service coverage area of base station 128, the user device 106 may be unable to receive a quality of service comparable to the quality of service that the user device 106 receives from the wireless service coverage area of base station 116.

Without any adjustments by the policy engine 118, the quality of service that the user device 106 receives from the wireless service coverage area of base station 128 may allow the user device to continue streaming "Universe Wars" in HD for two to three minutes after transitioning into the wireless service coverage area of base station 128. To improve the quality of service that the user device 106 receives from the wireless service coverage area of base station 128, the policy engine 118 may cause adjustments to be made in the connection between the user device 106 and the base station 116 or in the user device 106 itself. For example and without limitation, the policy engine 118 may adjust the bandwidth of the connection between the user device 106 and the base station 116 for the time that the user device 106 remains connected to the base station 116 or increase the size of the buffer of the user device 106. For example, the policy engine 118 may increase the bandwidth from ten megabits per second to twenty megabits per second. The policy engine 118 may also increase the size of the buffer of the user device 106 from one hundred megabytes to two hundred megabytes.

With the bandwidth and buffer adjusted, the user device 106 may continue to stream the video content 104, "Universe Wars," in HD while connected to base station 116 while also storing more of the video content 104 in the buffer. With more of the video content 104 stored in the buffer, the quality of service that the user experiences after crossing the boundary 130 may improve from the quality of service that the user would have experienced with no adjustment from the policy engine 118. For example, the user device 106 may be able to continue presenting the video content 104 at HD quality for four to six minutes after connecting to the base station 128.

Because the wireless service coverage area of base station 128 is of lower quality than the wireless service coverage area of base station 116, the network server 114 readjusts the bandwidth and the size of the buffer to match the capabilities of the base station 128 when the user device transitions to the base station 128. For example, the policy engine 118 may provide, to the user device 106, an instruction to adjust the bandwidth to two megabits per second and/or adjust the user buffer size to twenty megabytes when the user device transitions to the base station 128.

In some implementations, the location predictor 124 may provide the prediction data 132 to the user device 106. The user device 106 may provide a request to the policy engine 118 to adjust the bandwidth and/or the user buffer size. The policy engine 118 may grant the request based on analyzing the network capabilities of the base station 116 and the base station 128.

In some implementations, the base station 116 and base station 128 may be associated with different wireless service providers. For example, the base station 116 may be a part of the network of the wireless service provider that the user 102 subscribes to. When the user device 106 connects to the base station 128, the user device 106 may be roaming. In this instance, the base station 116 and the base station 128 may each communicate with their own network server that each communicate with the streaming service 112. In this instance, the network capabilities 134 may store the network capability data 136 for base stations that border the network of the wireless service provider that the user 102 subscribes to.

In some implementations, the base station and the base station may be associated with the same wireless service provider. For example, the base station 116 and the base station 128 may be a part of the network of the wireless service provider that the user 102 subscribes to. In this case, the base station 116 and the base station 128 may be part of the same wireless service coverage area and the base station 116 provides a higher quality of service than the base station 128. This may occur if the base station 116 includes newer hardware that has greater capabilities and capacity than the base station 128 that may include older hardware.

In some implementations, the user device 106 may determine that the user device 106 is about to cross the boundary 130. The user device 106 may make this determination based on data received from the network server 114. Additionally, or alternatively, the user device 106 may make this determination based on historical movement patterns of the user device 106 and historical network capabilities of the wireless network to which the user device 106 is connected. For example, the user device 106 may experience a decrease in the network capabilities around 11:00 am each day. In this case, the user device 106 may, each day before 11:00 am, take action to request, from the network server 114, an increase in bandwidth and/or an increase in the buffer size similar to the adjustments described above. As another example, the user device 106 may experience a decrease in network capabilities when the user device 106 is in within a certain geofence. If the user device 106 determines that the user device 106 is within a threshold distance of the geofence, then the user device 106 may take action to request, from the network server 114, an increase in bandwidth and/or an increase in the buffer size similar to the adjustments described above FIG. 2 is an example server 200 for managing delivery of streaming content while a user is moving from a higher quality wireless network coverage area to a lower quality wireless network coverage area. The server 200 may be any type of computing device that is configured to manage a wireless network. For example, the server 200 may be similar to network server 114 of FIG. 1. In some implementations, the server 200 may be a virtual computing device in the form of virtual machines or software containers that are hosted in a cloud. The components of server 200 may be implemented in a single computing device or distributed over multiple computing devices.

Figure 2:
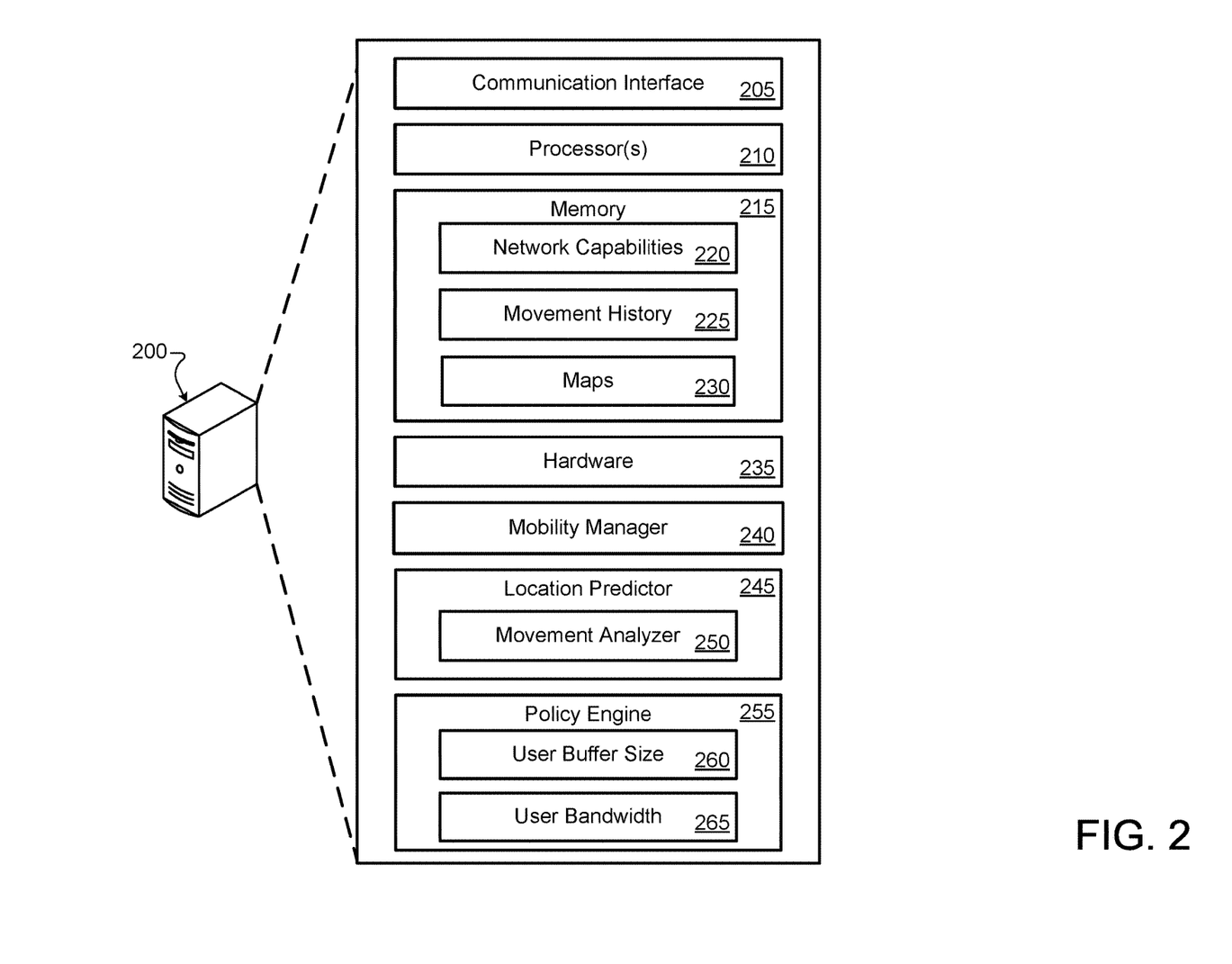
FIG. 2 illustrates an example server for managing delivery of streaming content while a user is moving from a higher quality wireless network coverage area to a lower quality wireless network coverage area.

The server 200 may include a communication interface 205, one or more processors 210, memory 215, and hardware 235. The communication interface 205 may include wireless and/or wired communication components that enable the server 200 to transmit data to and receive data from other networked devices. The hardware 235 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a mobility manager 240. The mobility manager 240 may be similar to the mobility manager 120 of FIG. 1. The mobility manager 240 may be configured to monitor the location of a user device that is connected to the server 200 through a wireless base station such as a gNodeB. The location of the user device may include the wireless base station to which the user device is connected and/or GPS data received from the user device. The mobility manager 240 may store the location data in the movement history 225 that is implemented by the memory 215.

In some implementations, the mobility manager 240 may store, in the network capabilities 220 of the memory 215, signal strength data related to the signal strength of the connection between the user device and the wireless base station. In some implementations, the mobility manager 240 may store beamforming data related to the direction and strength of a beamforming signal that the wireless base station uses to communicate with the user device. In some implementations, the mobility manager 240 may store timestamp data related to the time the mobility manager collected the location data, signal strength data, and/or beamforming data.

The mobility manager 240 may analyze the location data, signal strength data, beamforming data, and/or the timestamp data to determine the current movement of the user device. The current movement of the user may include a speed and trajectory of movement with respect to a current location. The mobility manager 240 may store the current movement of the user in the movement history 225.

The mobility manager 240 may determine the current movement of the user at periodic intervals, such as every thirty seconds. Additionally, or alternatively, the mobility manager 240 may determine the current movement of the user in response to the user device providing new GPS data, the mobility manager 240 receiving new signal strength data, and/or the mobility manager 240 receiving new beamforming data.

The one or more processors 210 may implement a location predictor 245. The location predictor 245 may be similar to the location predictor 124 of FIG. 1. The location predictor 245 may be configured to predict the location of the user device based on the current movement of the user device and other factors. The location predictor 245 may include a movement analyzer 250 that is configured to analyze past movement of the user device and/or past movement of other user devices.

The movement analyzer 250 may generate a model that is configured to receive the current movement of the user device and predict a future location of the user device. The movement analyzer 250 may train the model using the movement history 225 of the user device using machine learning. The movement history 225 may include the movement of the user device over the past day, week, month, or another time period. The model may also use pattern recognition to predict the future location of the user device. The pattern recognition may include identifying previous movements in the movement history 225 that are similar to the current movement of the user device. The model may predict that the user device may follow movements similar to past movements.

In some implementations, the movement analyzer 250 may access map data 230. The map data 230 may be stored in the memory 215 and/or accessed from a different computing device or storage. The movement analyzer 250 may compare the current movement of the user device to the map data to predict a future location of the user device.

Based on the predicted location of the user device, the location predictor 245 may determine a base station that the user device may connect to in the future. The location predictor 245 may compare the predicted location of the user device to the location of the base stations. The location predictor 245 may determine a time that the user device may likely disconnect from the current base station and connect to a new base station. The location predictor 245 may access base station location data that may be stored in the map data 230 and/or another computing device or storage.

The server 200 includes a policy engine 255 that is configured to determine an appropriate bandwidth to provide to the user device and buffer size for the user device. The policy engine 255 may determine the appropriate bandwidth based on the type of activity in which the user device is engaged, the wireless service plan of the user device, the available bandwidth of the network and/or base station to which the user device is connected, an/or any other similar factor. The policy engine 255 may be similar to the policy engine 118 of FIG. 1. The policy engine 255 may determine the bandwidth and buffer size based on a quality of service for the user device and based on the wireless coverage area in which that the user device is currently located. The bandwidth and buffer size may allow the user device to stream a high definition (HD) movie. For example, bandwidth may be ten megabits per second and the buffer size may be one hundred megabytes. The policy engine 255 may store data indicating the selections in the user buffer size 260 and the user bandwidth 265 in the network capabilities 220 of the memory 215.

The policy engine 255 receives the predicted location of the user device and time that the user device will likely be at the predicted location. The predicted location may include data identifying the location of the base station that provides wireless service coverage to the predicted location. The policy engine 255 may also access the current location of the user device, which may include data identifying the location of the current base station that is providing wireless service coverage to the current location. The policy engine 255 may also access the network capabilities 220 stored in memory 215. The network capabilities 220 may include the network capacity and current utilization of the current base station and the network capacity and current utilization of the next base station and/or subsequent base stations. The policy engine 255 analyzes the user buffer size 260, the user bandwidth 265, the predicted location, the current location, the network capabilities 220, and/or the current activity on the user device to determine whether the buffer size and/or the bandwidth should be adjusted before the user device connects to the new base station.

For example, the policy engine 255 may determine that the user device is currently streaming an HD movie that requires ten megabits per second of bandwidth. The predicted location of the user device places the user device in a network coverage area that is only capable of providing two megabits per second of bandwidth. To improve the quality of service provided to the user device in the two megabits per second, the policy engine 255 may determine an adjustment to the bandwidth provided to the user device and/or the on-device buffer of the user device before the user device transitions to the lower quality network. The policy engine 255 may use rules and/or logic implementing an algorithm to determine the adjustment. A rule may specify that the quality of service provided to the user device should remain steady for at least ten minutes after the user device transitions to the lower quality network. Doing so would allow the user to enjoy HD quality video for a period of time after transitioning to the lower quality network.

The goal of the policy engine 255 may be to select a buffer size and/or bandwidth for the user device so that the user device enjoys a higher quality of service when the user device connects to the next base station than if the user device connected to the next base station without the buffer size and/or bandwidth adjustment. The policy engine 255 may increase the temporarily increase the buffer size and/or bandwidth while the user device is connected to the current base station. This increase should improve the quality of service that the user device experiences when connected to the next base station. This adjustment may allow the user to stream video content in HD for longer after connecting to the next base station than the user would have been able to do without the adjustment.

Figure 3:
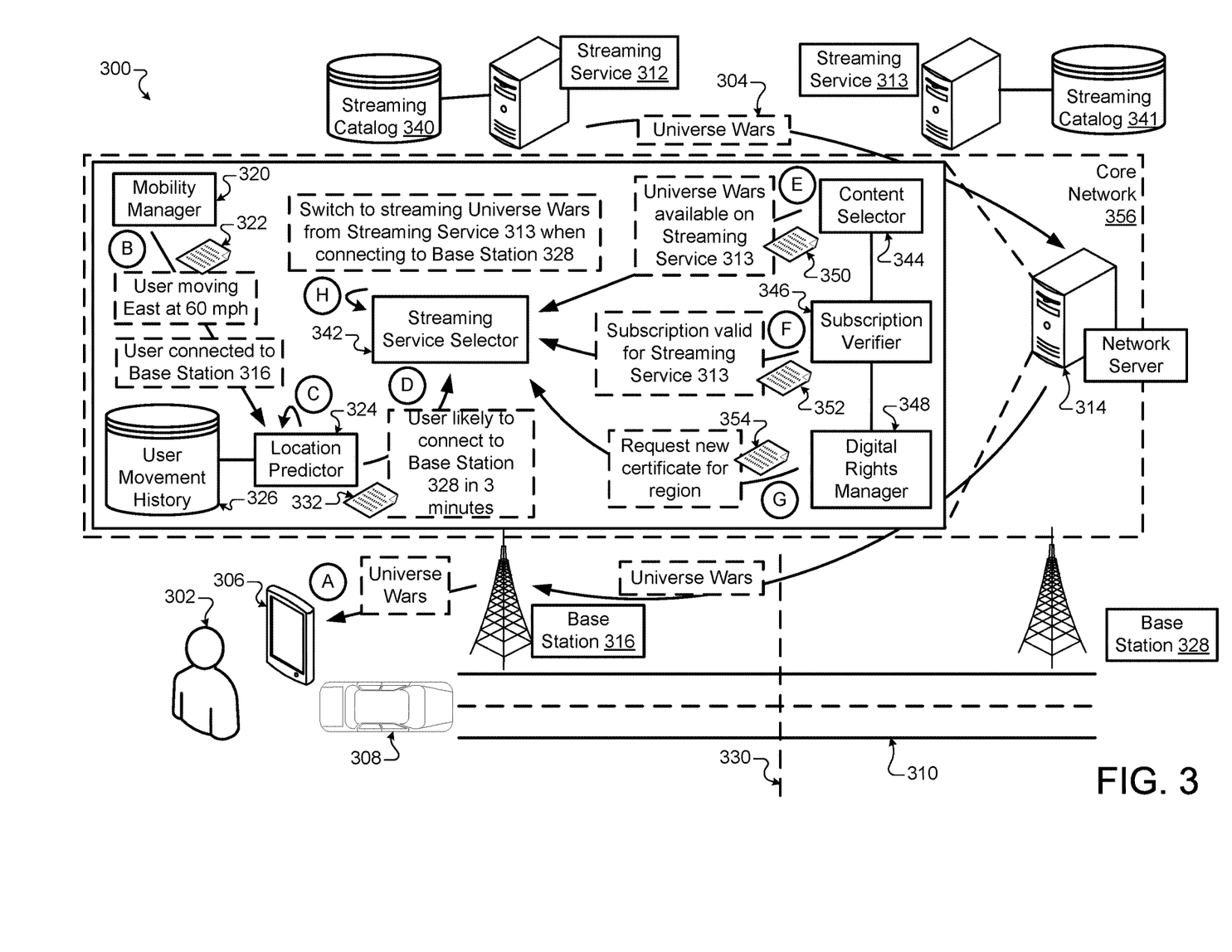
FIG. 3 illustrates an example system for identifying a new streaming service when a user moves from one region to another.

FIG. 3 illustrates an example system 300 for identifying a new streaming service when a user moves from one region to another. Briefly, and as described in more detail below, the user 302 is streaming video content 304 on the user device 306 while riding in the car 308. Before the user 302 moves into a new region, the system 300 identifies a new streaming service that can provide the same or similar video content to the video content 304. By identifying the new streaming service, the user 302 is able to enjoy the video content uninterrupted even when traveling between regions.

A region may be an area defined by a geographic and/or political boundary. In some regions, a streaming service may offer a particular set of media content. In different regions, the streaming service may offer a different set of media content. In other different regions, the streaming service may not be available. Some wireless service coverage areas may share boundaries with adjacent regions. For example, the boundary 330 may separate two regions. Base station 316 may provide wireless service coverage to a region on one side of the boundary 330, and base station 328 may provide wireless service coverage to another region on the other side of the boundary 330.

The system 300 includes some similar characteristics and components to the system 100 of FIG. 1. The similar characteristics and components may perform functions similar to system 100. Stage A of FIG. 3 is similar to stage A of FIG. 1. The user 302 is streaming video content 304 while traveling along road 310 in the car 308. The streaming service 312 provides the video content 304 to the network server 314 that provides the video content 304 to the user device 306.

Stage B of FIG. 3 is similar to stage B of FIG. 1. The mobility manager 320 of the network server 314 monitors the movement of the user device 306. The mobility manager 320 generates the movement data 322 that indicates that the user device 306 is moving east at sixty miles per hour and is connected to base station 316. The mobility manager 320 may be software or executable instructions embodied in computer-readable media included in or accessible by the network server 314.

Stage C of FIG. 3 is similar to stage C of FIG. 1. The location predictor 324 receives and analyzes the movement data 322. The location predictor 324 accesses the user movement history 326. Based on the movement data 322 and the user movement history 326, the location predictor determines that the user device 306 is likely to connect to base station 328 in three minutes. The location predictor 324 may be software or executable instructions embodied in computer-readable media included in or accessible by the network server 314.

Stage D of FIG. 3 is somewhat similar to stage D of FIG. 1. The location predictor provides the prediction data 332 to the streaming service selector 342. This is in contrast to the location predictor 124 providing the prediction data 132 to the policy engine 118 in FIG. 1. The streaming service selector 342 may be software or executable instructions embodied in computer-readable media included in or accessible by the network server 314.

The network server 314 may be included in a wireless carrier network that provides voice and data communication services to multiple user devices, such as the user device 306. The wireless carrier network may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or other similar standards.

The wireless carrier network may include a radio access network and a core network 356. The network server 314 may be included in the core network 356. The radio access network may include multiple base stations, such as base station 316. The multiple base stations are responsible for handling voice and data traffic between multiple user devices, such as the user device 306, and the core network 356. Accordingly, each of the base stations may provide a corresponding network cell that delivers telecommunication and data communication coverage. The core network 356 may use the network cells to provide communication services to the multiple subscriber devices. For example, the core network 356 may connect the multiple subscriber devices to other telecommunication and data communication networks, such as the Internet and the public switched telephone network (PSTN). The base stations are responsible handling voice and data traffic between user devices and the core network 356. In some implementations, the base stations may be in the form of eNodeB nodes. Each eNodeB node may include a base transceiver system (BTS) that communicates via an antennae system over an air-link with one or more user devices that are within range. The antenna system of an eNodeB node may include multiple antennas that are mounted on a radio tower to provide a coverage area that is referred to as a "cell." The BTS may send RF signals to user devices and receive radio signals from subscriber devices.

In some implementations, the base station 316 and the base station 328 are part of separate wireless carrier networks. A first wireless carrier network may include the core network 356 and a radio access network that includes the base station 316. A second wireless carrier network may include a different core network and a different radio access network that includes the base station 328. In some implementations, the base station 316 and the base station 328 are part of the same wireless carrier network. The wireless carrier network includes the core network 138 and a ratio access network that includes the base station 316 and the base station 328.

The streaming service selector 342 is configured to identify media content similar to the video content 304 that the user can watch on the user device 306 when the user device 306 crosses the boundary 330 between wireless service coverage areas that are associated with different streaming services. In some implementations, the streaming service selector 342 may be configured to identify similar media content between the streaming catalog 340 of the streaming service 312 and the streaming catalog 341 of the streaming service 313 on a periodic basis, such as every day. In some implementations, the streaming service selector 342 may be configured to identify similar media content between the streaming catalog 340 of the streaming service 312 and the streaming catalog 341 of the streaming service 313 in response to determining that content has been added or removed from the streaming catalog 340 and/or the streaming catalog 341. In some implementations, the streaming service selector 342 may be configured to identify media content similar to the video content 304 in response to receiving the prediction data 332 and/or in response to receiving, from a component of the network server 314 that receives and transmits data between the internet and the user device 306, data indicating that the user device 306 is streaming the video content 304.

In stage E, the content selector 344 identifies the video content 304 that the user device 306 is currently receiving. The content selector 344 may be software or executable instructions embodied in computer-readable media included in or accessible by the network server 314. The content selector 344 also receives, from a component of the network server 314 that receives and transmits data between the internet and the user device 306, data indicating that the streaming service 312 is providing the video content from the streaming catalog 340. The content selector 344 receives data indicating that the user device 306 is likely to connect to the wireless service coverage area covered in part by base station 328. The content selector 344 may determine that the wireless service coverage area of the base station 328 is located in a different region than that the wireless service coverage area of base station 316. The streaming service 312 may not have the necessary rights to stream the video content 304 in the region covered by the wireless service coverage area of the base station 328. Because of this lack of rights, the content selector 344 may search other streaming services that are available in the region covered by the wireless service coverage area of the base station 328.

The content selector 344 may determine that streaming service 313 is configured to stream content from the streaming catalog 341 in the region covered by the wireless service coverage area of the base station 328. The content selector 344 may identify other streaming services that stream content region covered by the wireless service coverage area of the base station 328. The content selector 344 determines which of the streaming services available in the region covered by the wireless service coverage area of the base station 328 include content similar to the video content 304 in their streaming catalog. The content selector 344 determines that the streaming catalog 341 includes content similar to the video content 304. For example, the content selector 344 determines that the streaming catalog 341 of the streaming service 313 includes "Universe Wars" and has sufficient rights to stream "Universe Wars" in the region covered by the wireless service coverage area of the base station 328.

The content selector 344 generates content availability data 350 indicating that streaming service 313 can stream content similar to video content 304 to the region covered by the wireless service coverage area of the base station 328. The content selector provides the content availability data 350 to the streaming service selector 342. In some implementations, the content availability data 350 may include data indicating multiple streaming services that can stream content similar to video content 304 to the region covered by the wireless service coverage area of the base station 328.

In stage F, the subscription verifier 346 determines which streaming services the user 302 subscribes to. The subscription verifier 346 may be software or executable instructions embodied in computer-readable media included in or accessible by the network server 314. The subscription verifier 346 may access data that identifies the streaming services that the user 302 has accessed on the user device 306. In some instances, the user device 306 may store tokens that allow the user device 306 to subsequently access a streaming service after the user 302 has logged in the first time on the user device 306. The subscription verifier 346 may determine which of those tokens are able to access a streaming service. In some instances, the user 302 may have other user devices that subscribe to the wireless service coverage area. In this case, the subscription verifier 346 may also determine which valid tokens for streaming services are stored on those user devices.

The subscription verifier 346 may generate subscription data 352 that indicates the streaming services that that the user 302 subscribes to. The subscription data 352 may also indicate which of those streaming services the user device 306 is already able to access by virtue of a corresponding token being stored on the user device 306. In instances where the user 302 accessed the streaming service on another device and a corresponding token is not stored on the user device 306, the subscription data 352 may indicate subscription services that the user may have a subscription to but for which the user device 306 may not store a token.

In some implementations, the subscription verifier 346 may determine which streaming services identified in the content availability data 350 the user 302 subscribes to. For example, the subscription verifier 346 may receive the content availability data 350 that indicates that the streaming service 313 and other streaming services are able to stream "Universe Wars" in the region covered by the wireless service coverage area of the base station 328. The subscription verifier 346 may determine that the user 302 has a valid subscription to the streaming service 313. In this case, the content availability data 350 may indicate that the user 302 has a valid subscription to the streaming service 313.

In some implementations, the subscription verifier 346 may determine that the user 302 does not subscribe to any of the streaming services identified in the content availability data 350. In this case, the network server 314 or an entity operating the network server 314 may provide a subscription to one or more of the streaming services identified in the content availability data 350. The user 302 may take advantage of this subscription. In some instances, the user 302 may be limited by the amount of time (e.g., one hour) that the user 302 can use the subscription of the network server 314 and/or be limited by the amount of data (five gigabytes) that the user 302 can use through the subscription of the network server 314. In some instances, the user 302 may be limited by the area where the user 302 can use the subscription of the wireless carrier. For example, the user 302 may use the subscription of the network server 314 if the user device 306 is within a certain distance (e.g., five miles) of the boundary 330.

In stage G, the digital rights manager 348 may determine whether the user device 306 has the appropriate DRM certificate to stream the matching content identified by the content availably data 350 and the subscription data 352. The digital rights manager 348 may be software or executable instructions embodied in computer-readable media included in or accessible by the network server 314. Based on the details related to the user device 306 likely connecting to a base station 328 of a wireless service coverage area that is in a different region, the digital rights manager 348 may determine that the current DRM certificate stored on the user device 306 is insufficient for the new region. This may occur when the boundary 330 is between countries. If the current DRM certificate is not valid for the new region, then digital rights manager 348 may request the new certificate for the region and provide that new certificate to the user device 306. In some instances, the digital rights manager 348 may generate a DRM certificate request 354 that indicates for the streaming service selector 342 to request and provide the new certificate to the user device 306. In some instances, the DRM certificate stored in the user device 306 is valid for the new region. In this case, the digital rights manager 348 may take no action.

In stage H, the streaming service selector 342 analyzes the content availably data 350, the subscription data 352, and the DRM certificate request 354 to select the appropriate streaming service. The streaming service selector 342 selects a streaming service to ensure that the user 302 is able to continue watching the video content 304 after the user 302 and the user device 306 cross the boundary 330. The boundary 330 may indicate where the user device 306 disconnects from the base station 316 of one wireless service coverage area and connects to the base station 316 of another wireless service coverage area.

The streaming service selector 342 factors in the availability of content similar to the video content 304, the subscription status of the user 302, and other data to select the appropriate streaming service. In some instances, the other data can include the connection speed between available streaming services and the user device 306. For example, if the video content 304 is available on more than one streaming service that the user 302 subscribes to, then the streaming service selector 342 may select the streaming service with the faster connection. In the example shown in FIG. 3, the streaming service selector 342 selects the streaming service 313. The network server 314 provides the user device 306 an instruction to automatically access the streaming service 313 upon connection to the base station 328. In some implementations, the network server 314 automatically transitions the user device 306 to the streaming service 313. This may occur if the network server 314 communicates with both the base station 316 and the base station 328. In some implementations, the network server 314 provides an instruction to a network server of the base station 328 to automatically connect the user device 306 to the streaming service 313 upon the user device 306 connecting to the base station 328.

In some implementations, the video content 304 may not be available in the region covered by the wireless service coverage area of the base station 328. This may occur if the boundary 330 is between countries and the streaming services on either side of the boundary 330 provide content in different languages. In this case, the content selector 344 may identify the content most similar to the video content 304. For example, the most similar content may be "Universe Wars" in a language that is different than the language of the video content 304. In some implementations, the network server 314 provides the streaming service 313 an instruction to begin providing the similar content before the user device 306 transitions to the base station 328. In this case, the user device 306 may store in a buffer the similar content and begin displaying the similar content when the user device 306 transitions to the base station 328.

In some instances, the similar content may be accessible on a streaming service that the user 302 does not have a subscription to. The similar content may also not be available on any streaming services that the user 302 has a subscription to. In this instance, the content availably data 350 may indicate that the similar content is available from a streaming service in the new region, and the subscription data 352 may indicate that the user 302 does not have a subscription to that streaming service. The streaming service selector 342 may provide a notification to the user device 306 that the user device 306 will be unable to stream the similar content when the user 302 crosses the boundary 330. The streaming service selector 342 may also provide the user 302 with the option of subscribing to the identified streaming service. If the user subscribes, then the streaming service selector 342 selects that streaming service to stream the similar content when the user 302 crosses the boundary 330.

In some instances, the subscription data 352 may indicate that the user 302 does not have a subscription to the streaming service that has the similar content available, but the user 302 does actually have a subscription. In this case, the prompt to subscribe to the identified streaming service may also include an option for the user 302 to log in to the identified streaming service and/or include an option for the network server 314 to log in to the identified streaming service using previously user-provided credentials.

Figure 4:
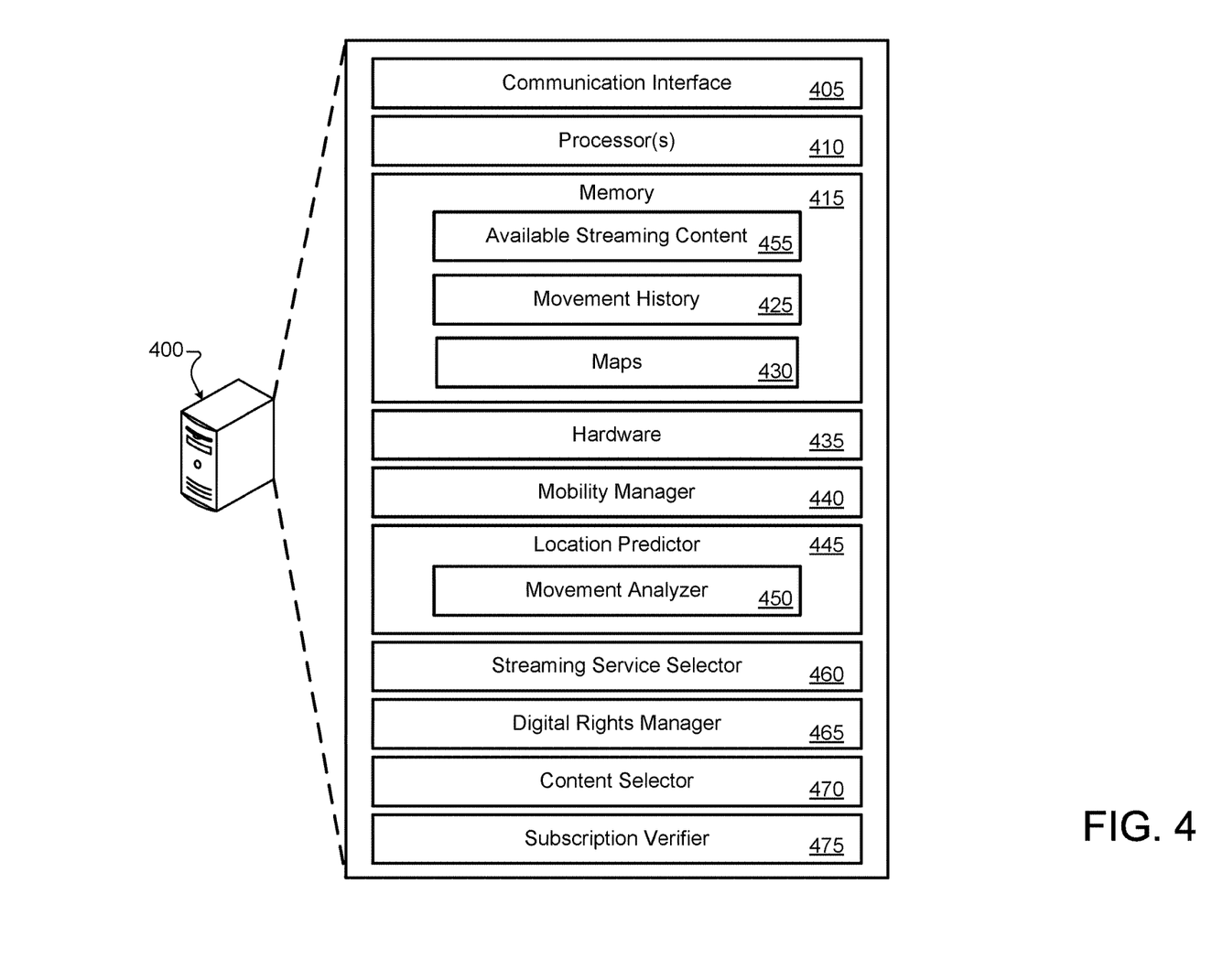
FIG. 4 illustrates an example server for identifying a new streaming service when a user moves from one region to another.

FIG. 4 is an example server 400 for identifying a new streaming service when a user moves from one region to another. The server 400 may be any type of computing device that is configured to manage a wireless network. For example, the server 400 may be similar to network server 314 of FIG. 3. In some implementations, the server 400 may be a virtual computing device in the form of virtual machines or software containers that are hosted in a cloud. The components of server 400 may be implemented in a single computing device or distributed over multiple computing devices.

The server 400 may include a communication interface 405, one or more processors 410, memory 415, and hardware 435. The communication interface 405 may include wireless and/or wired communication components that enable the server 400 to transmit data to and receive data from other networked devices. The hardware 435 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 415 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The server 400 includes components that are similar to components in FIG. 1, FIG. 2, and FIG. 3. The one or more processors 410 may implement a mobility manager 440. The mobility manager 440 may be similar to the mobility manager 120 of FIG. 1, the mobility manager 240 of FIG. 2, and/or the mobility manager 320. The movement history 425 may be similar to the movement history 225 of FIG. 2. The mobility manager 440 may analyze location data of a user device, signal strength data between the user device and a base station, beamforming data of the connection between the user device and the base station, and/or the timestamp data that indicates a time of collecting the data to determine the current movement of the user device. The current movement of the user may include a speed and trajectory of movement with respect to a current location. The mobility manager 440 may store the current movement of the user in the movement history 425

The one or more processors 410 may implement a location predictor 445. The location predictor 445 may be similar to the location predictor 124 of FIG. 1, the location predictor 245 of FIG. 2, and/or the location predictor 324 of FIG. 3. The location predictor 445 may be configured to predict the location of the user device based on the current movement of the user device and other factors. The location predictor 445 may include a movement analyzer 450 that is configured to analyze past movement of the user device and/or past movement of other user devices. The movement analyzer 450 may be similar to the movement analyzer 250 of FIG. 2. The location predictor 445 and the movement analyze 450 may leverage the map data 430 to predict the location of the user device. The map data 430 may be similar to the map data 230 of FIG. 2.

The one or more processors 410 may implement a streaming service selector 460. The streaming service selector 460 may be similar to the streaming service selector 342 of FIG. 3. The streaming service selector 342 may be configured to identify the media content that the user device is streaming while connected to a first wireless service coverage area. Based on the predicted location of the user device, the streaming service selector 342 may determine that the user device is unable to continue streaming the media content when the user device connects to a second wireless service coverage area. The streaming service selector 342 identifies new media content that is similar to the media content that the user device can stream when the user device leaves the first wireless service coverage area and enters the second wireless service coverage area.

The streaming service selector 342 may receive content availability data from the content selector 470. The content selector 470 may be similar to the content selector 344 of FIG. 3. The content availability data may indicate the streaming services that are able to stream content in the region covered by the second wireless service coverage area. The content availability data may also indicate the streaming services that have content similar to the media content that the user device is streaming. The similar content may include the media content that is the same, media content that is the same except for being in a different language, or media content that is a localized version of the media content that the user device is streaming, for example.

The streaming service selector 342 may receive subscription data from the subscription verifier. The subscription verifier 475 may be similar to the subscription verifier 346 of FIG. 3. The subscription data may indicate which streaming services the user of the user device is currently subscribed to. In some instances, the server 400 may store or have access to data indicating which streaming services the user is subscribed to because the subscription was obtained through the wireless carrier and from the streaming service provider. The server 400 may store or have access to data indicating which streaming services the user is subscribed to because of previous similar activity on the wireless network of the server 400. The server 400 may know whether the user is a subscriber via an API from the streaming service.

Based on the content availability data and the subscription data, the streaming service selector 342 may select similar media content that the user device is able to stream when the user device leaves the first wireless service coverage area and enters the second wireless service coverage area. The streaming service selector 342 may select a new streaming service that the user is subscribed to and that can stream the similar media content. The streaming service selector 342 may provide instructions to the user device to begin streaming the similar media content from the new streaming service when the user device leaves the first wireless service coverage area and enters the second wireless service coverage area.

The server 400 may include a digital rights manager 465 that is configured to ensure that the user device has the proper DRM certificates to stream the similar media content. The digital rights manager 465 may be similar to the digital rights manager 348 of FIG. 3. The digital rights manager 465 receives data indicating the similar media and new streaming service selected by the streaming service selector 342. If the user device has the proper DRM certificates for the similar media content for the new region of the second wireless service coverage area, then the digital rights manager 465 may take no action. If the user device does not have the proper DRM certificates, then the digital rights manager 465 may identify the proper DRM certificates and provide them to the user device.

Figure 5:
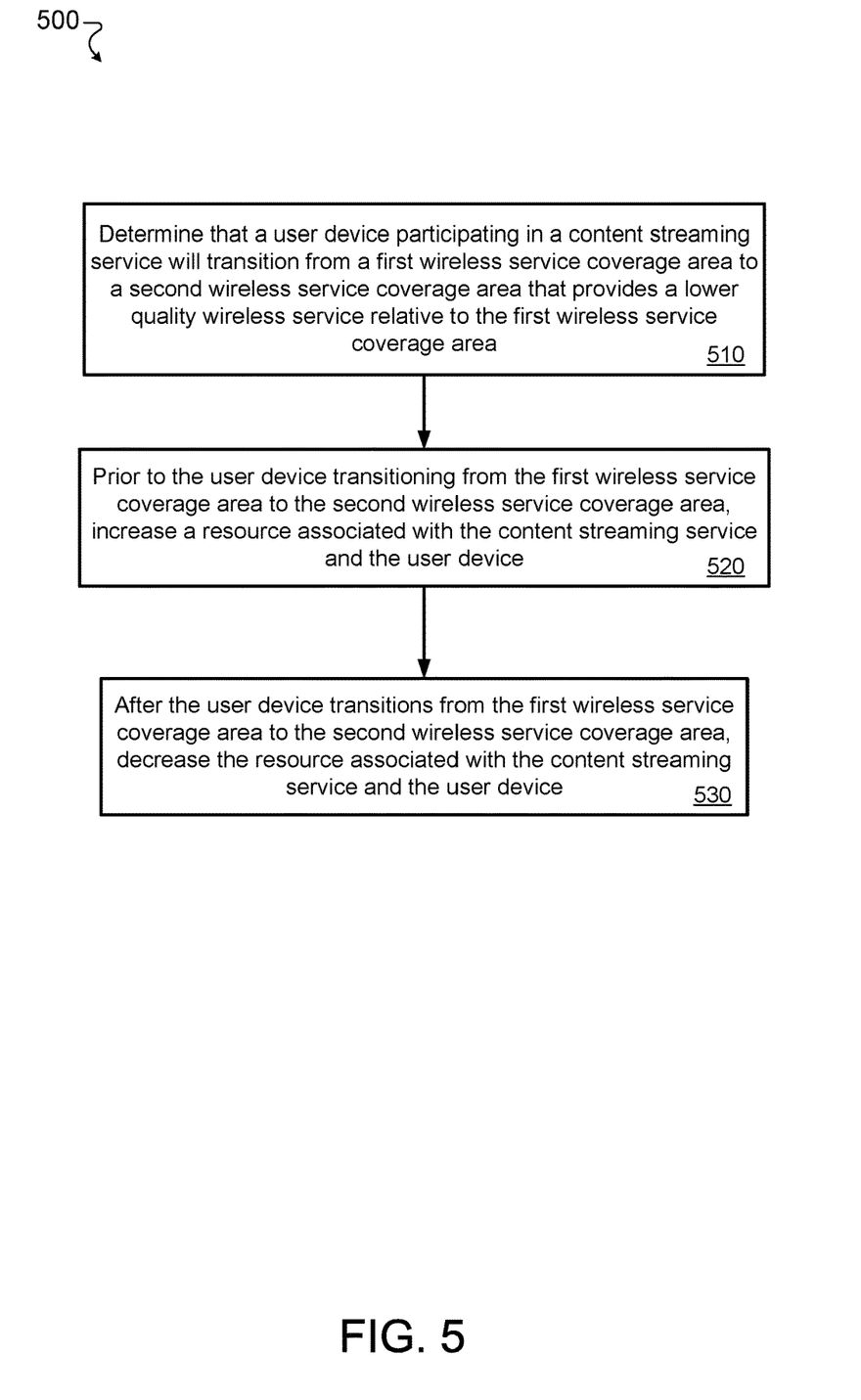
FIG. 5 is a flowchart of an example process for delivering streaming content while a user is moving from a higher quality wireless network coverage area to a lower quality wireless network coverage area.

FIG. 5 is a flowchart of an example process 500 for delivering streaming content while a user is moving from a higher quality wireless network coverage area to a lower quality wireless network coverage area. In general, the process 500 monitors the movement of a user device while the user device is streaming media content. When the process 500 determines that the user device is likely to connect to a lower quality wireless service, the process 500 adjusts a resource associated with streaming the media content. When the user device connects to the lower quality wireless service, the process readjusts the resource. The process 500 will be described as being performed by a computer system comprising one or more computers with reference to the system 100 of FIG. 1 or the server 200 of FIG. 2.

The network server 114 determines that a user device 106 participating in a content streaming service will transition from a first wireless service coverage area to a second wireless service coverage area that provides a lower quality wireless service relative to the first wireless service coverage area (510). The user device 106 may be streaming media content from the content streaming service while the user device 106 is a first wireless service coverage area. Based on the movement of the user device, the network server 114 may determine that the user device 106 is likely to enter a second wireless service coverage area. The network server 114 may compare the quality of the first wireless service coverage area and the quality of the second wireless service coverage area and determine that the first wireless service coverage is higher quality than the second wireless service coverage area. The quality of a wireless service coverage area may be based on the speed available, bandwidth available, bandwidth currently used, number of available connections, number of connected devices, and other similar parameters.

In some implementations, the network server 114 determines that the user device 106 is likely to enter the second wireless service coverage area by predicting the movement of the user device 106. This prediction may be based on the recent movement of the user device 106 which may include the movement of the user device 106 while the user device 106 was in the first wireless service coverage area and/or the movement of the user device 106 while the user device 106 was streaming the media content. The recent movement of the user device 106 may include the movement of the user device 106 for a particular time period such as the last thirty minutes, hour, two hours, etc. The recent movement of the user device 106 may include the movement of the user device 106 since the movement of the user device 106 was greater than a threshold. For example, the recent movement may include the movement of the user device 106 since the user device 106 began moving faster than three miles per hour. In some instances, the threshold may be based on the speed of the user device 106 such that the threshold is ten percent of the speed.

The prediction may also be based on other factors. A first factor may be a map. The network server 114 may predict that the user device 106 is likely to continue along the road that the user device 106 is currently moving along or continue along a route that the user device or other user devices has previously followed. A second factor may be the past movement of the user device 106. This past movement may include the movement of the user device 106 over a longer time period such as a week, month, year, etc. A third factor may be the past movement of other user devices. This past movement may include movement of the other user devices over periods such as a week, month, year, etc.

The network server 114 may determine whether the recent movement matches any of the past movements of the user device 106 or the past movements of the other user devices. In this case, the network server 114 may predict a future location of the user device 106. The future location may include an address, intersection, point of interest, latitude and longitude, neighborhood, or another similar location. Based on the future location, the network server 114 determines a wireless base station that the user device 106 is likely to connect to in the future. The future base station may be part of the second wireless service coverage area.

Prior to the user device 106 transitioning from the first wireless service coverage area to the second wireless service coverage area, the network server 114 increases a resource associated with the content streaming service and the user device 106 (520). The network server 114 determines an amount of time before the user device 106 transitions from the first wireless service coverage area to the second wireless service coverage area. Based on that amount of time, the network server 114 determines which resources to increase and by how much. The resources may include a wireless communication bandwidth allocated to the user device 106 and/or content streaming buffer size. The content streaming buffer may be located on the user device 106, a network access point such as a base station, and/or within the network server 114.

The network server 114 increases the resources above a level at which the first wireless service coverage area typically maintains the resources. For example, the network server 114 may typically allocate a wireless communication bandwidth of ten megabits per second to the user device 106 and set the content streaming buffer to one hundred megabytes. Based on determining that the user device 106 will transition to the lower quality, second wireless service coverage area, the network server 114 increases the resources above these typical levels to a wireless communication bandwidth of twenty megabits per second and the content streaming buffer of two hundred megabytes After the user device 106 transitions from the first wireless service coverage area to the second wireless service coverage area, the network server 114 decreases the resource associated with the content streaming service and the user device 106 (530). Because the second wireless service coverage area is of lower quality than the first wireless service coverage area, the resources used by the user device 106 when connecting to the second wireless service coverage area may be less than the resources used when connected to the first wireless service coverage area. When the network server 114 decreases the resources, the network server 114 may set the resources to the typical level for the second wireless service coverage area. The typical level for the second wireless service coverage area may be less than both the typical level for the first wireless service coverage area and the increased level for the first wireless service coverage area.

The network server 114 may need to reduce the resources of the user device 106 when transitioning to the second wireless service coverage area because the quality of the wireless service of the second wireless service coverage area is less than the first wireless service coverage area. The second wireless service coverage area may be unable to support the use of resources at the typical level or increased level of the first wireless service coverage area. For example, the network server 114 may reduce the wireless communication bandwidth allocated to the user device 106 to two megabits per second and reduce the content streaming buffer size to twenty megabytes. In some implementations, the network server 114 may only reduce the levels of some of the resources. For example, the network server 114 may reduce the wireless communication bandwidth allocated to the user device 106 to two megabits per second and maintain the content streaming buffer size at two hundred megabytes.

By increasing the resources used by the user device 106 while the user device 106 is still connected to the first wireless service coverage area, the network server 114 is able to increase the quality of service experienced by the user device 106 when the user device 106 connects to the second wireless service coverage area. As noted above, the typical level for the resources when the user device 106 is connected to the second wireless service coverage area may be a wireless communication bandwidth of two megabits per second and/or a content streaming buffer size of twenty megabytes. If the network server 114 did not increase the resources before the user device 106 transitioned from the first wireless service coverage area to the second wireless service coverage area, the quality of service would degrade soon after the transition. By increasing the resources before the transition, the quality of service may be maintained at a level similar to the first wireless service coverage area for a longer period of time after the transition.

Figure 6:
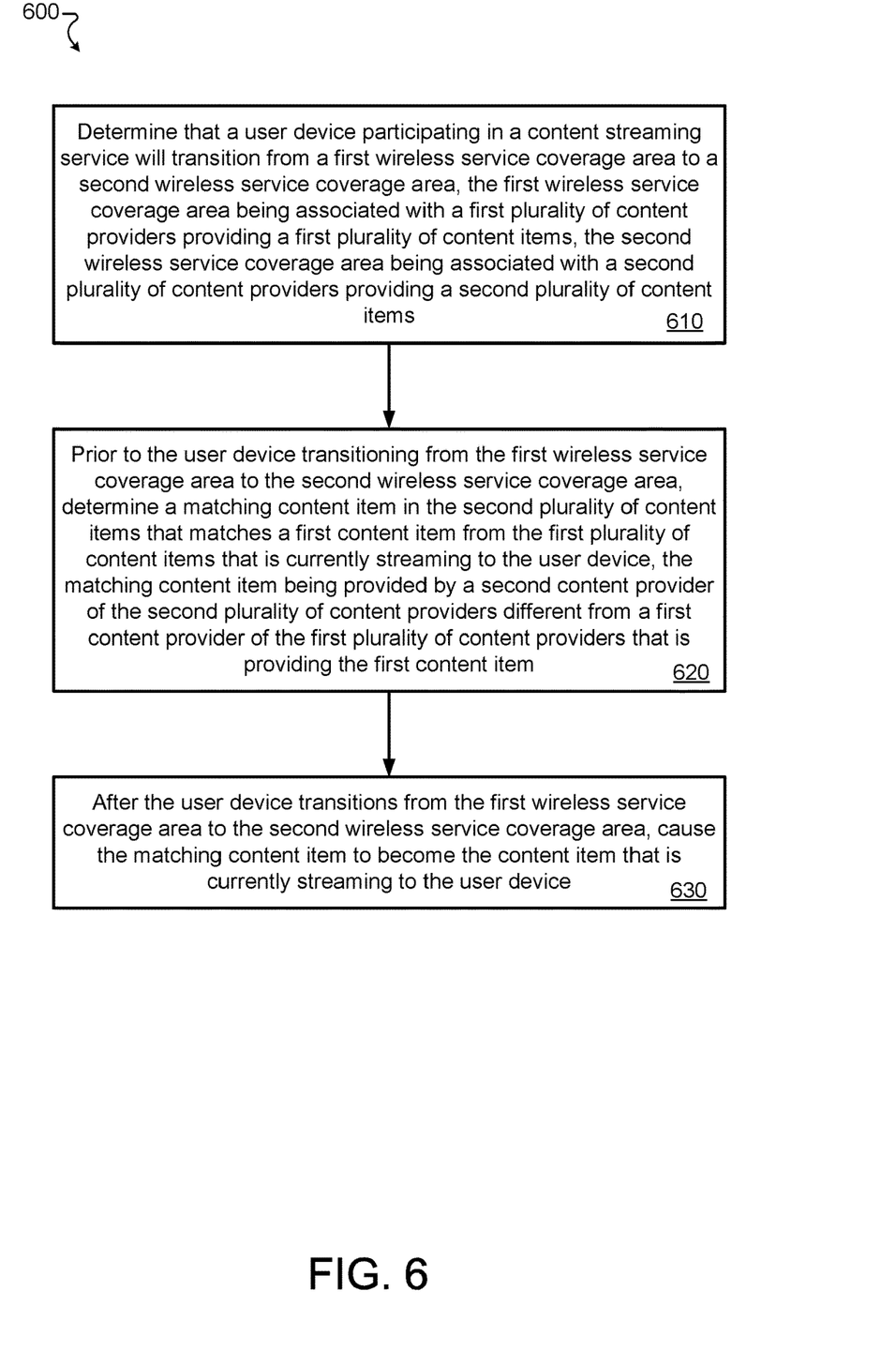
FIG. 6 is a flowchart of an example process for identifying a new streaming service when a user moves from one region to another.

FIG. 6 is a flowchart of an example process 600 for identifying a new streaming service when a user moves from one region to another. In general, the process 600 monitors the movement of a user device while the user device is streaming media content. When the process 600 determines that the user device is likely to move to a new wireless service coverage area, the process 600 determines whether the user device can continue to stream the media content. If the user device is unable to continue streaming the media content, the process 600 may identify similar media content that the user device can stream when the user device is in the new wireless service coverage area. The process 600 may switch the user device to stream the similar media content when the user device transitions to the new wireless service coverage area. The process 600 will be described as being performed by a computer system comprising one or more computers with reference to the system 300 of FIG. 3 or the server 400 of FIG. 4. In some implementations, features of the process 600 may be used in combination with features of the process 500. In some implementations, the features of the process 600 and the features of the process 500 may be used independently.

The network server 314 determines that a user device 306 participating in a content streaming service will transition from a first wireless service coverage area to a second wireless service coverage area, the first wireless service coverage area being associated with a first plurality of streaming services providing a first plurality of content items, the second wireless service coverage area being associated with a second plurality of streaming services providing a second plurality of content items (610). The user device 306 may be streaming a content item from the streaming service while the user device 306 is in a first wireless service coverage area. Based on the movement of the user device 306, the network server 314 may determine that the user device 306 is likely to enter a second wireless service coverage area. The network server 314 may determine that the content item is not available in the second wireless service coverage area. This may be because the wireless service coverage areas are in different regions and there may be different media rights covering each region, different content items are offered in each region, and/or content items are offered in different languages. In some implementations, the network server 314 compares the available content items in response to determining that the user device 306 is likely to transition wireless service coverage areas In some implementations, each region may have separate streaming services. A first streaming service may serve the first region covered by the first wireless service coverage area. The first streaming service may be able to stream a first group of content items. A second streaming service may serve the second region covered by the second wireless service coverage area. The second streaming service may be able to stream a second group of content items. There may be some overlap between content items between the first group and the second group. There may also be some content items included in the first group or the second group and not included in the other group.

In some implementations, the network server 314 determines that the user device 306 is likely to enter the second wireless service coverage area by predicting the movement of the user device 306. This prediction may be based on the recent movement of the user device 306 which may include the movement of the user device 306 while the user device 306 was in the first wireless service coverage area and/or the movement of the user device 306 while the user device 306 was streaming the media content. The recent movement of the user device 306 may include the movement of the user device 306 for a particular time period such as the last thirty minutes, hour, two hours, etc. The recent movement of the user device 306 may include the movement of the user device 306 since the movement of the user device 306 was greater than a threshold. For example, the recent movement may include the movement of the user device 306 since the user device 306 began moving faster than three miles per hour. In some instances, the threshold may be based on the speed of the user device 306 such that the threshold is ten percent of the speed.

The prediction may also be based on other factors. A first factor may be a map. The network server 314 may predict that the user device 306 is likely to continue along the road that the user device 306 is currently moving along or continue along a route that the user device 306 or other user devices has previously followed. A second factor may be the past movement of the user device 306. This past movement may include the movement of the user device 306 over a longer time period such as a week, month, year, etc. A third factor may be the past movement of other user devices. This past movement may include movement of the other user devices over periods such as a week, month, year, etc.

The network server 314 may determine whether the recent movement matches any of the past movements of the user device 306 or the past movements of the other user devices. In this case, the network server 314 may predict a future location of the user device 306. The future location may include an address, intersection, point of interest, latitude and longitude, neighborhood, or another similar location. Based on the future location, the network server 314 determines a wireless base station that the user device 306 is likely to connect to in the future. The future base station may be part of the second wireless service coverage area.

Prior to the user device 306 transitioning from the first wireless service coverage area to the second wireless service coverage area, the network server 314 determines a matching content item in the second plurality of content items that matches a first content item from the first plurality of content items that is currently streaming to the user device 306, the matching content item being provided by a second streaming service of the second plurality of streaming services different from a first streaming service of the first plurality of streaming services that is providing the first content item (620). In this case, the network server 314 determines that the content item is not available from the second streaming service. The network server 314 identifies a matching content item that is the same as the content item, for example, the same movie or that is similar, for example, the same movie in a different language.

To select the second streaming service, the network server 314 determines that the second streaming service is able to provide the matching content item. The network server 314 may also determine that the user of the user device 306 is able to access the second streaming service. The second streaming service may be a subscription service. The network server 314 may verify that the user has a valid subscription to the second streaming service.

In some implementations, the network server 314 may verify that the user device 306 has the correct DRM certificates stored on or accessible by the user device 306. If the user device 306 does not have the correct DRM certificates, then the network server 314 may request that the user device 306 access the correct DRM certificates for the matching content item.

After the user device 306 transitions from the first wireless service coverage area to the second wireless service coverage area, the network server 314 causes the matching content item to become the content item that is currently streaming to the user device 306 (630). In this case, the user device 306 is at least in part able to provide uninterrupted streaming of content across wireless service coverage area boundaries independent of the second streaming service being different from the first streaming service.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
    determining that a user device that is communicating with a first wireless network, streaming media content at a first bitrate, buffering the media content in a buffer of a first size, and outputting the media content at a first resolution will transition to a second wireless network;
    determining that the second wireless network is configured to stream the media content at a second bitrate that allows the user device to output the media content at a second resolution;
    determining that the first bitrate is greater than the second bitrate;
    based on determining that the first bitrate is greater than the second bitrate and while the user device is communicating with the first wireless network and outputting the media content at the first resolution, increasing a bitrate of the media content above the first bitrate and outputting a first instruction to increase the buffer to a second size that is greater than the first size; and after the user device ceases to communicate with the first wireless network and begins to communicate with the second wireless network and while the user device continues to output the media content at the first resolution for a period of time, adjusting the bitrate of the media content to the second bitrate and outputting a second instruction to decrease the buffer to a third size that is less than the first size.

2. The method of claim 1, wherein determining that the user device that is communicating with the first wireless network, streaming the media content at a first bitrate, buffering the media content in the buffer of the first size, and outputting the media content at the first resolution will transition to the second wireless network is based on a movement pattern of the user device.

3. The method of claim 1, comprising:
based on determining that the first bitrate is greater than the second bitrate, increasing a wireless communication bandwidth that the first wireless network allocates to the user device.

4. The method of claim 1, comprising:
before determining that the user device that is communicating with the first wireless network, streaming media content at the first bitrate, buffering the media content in the buffer of the first size, and outputting the media content at the first resolution will transition to the second wireless network, maintaining the bitrate of the media content at the first bitrate.

5. The method of claim 1, wherein:
the first wireless network provides a first quality of service to the user device based on maintaining the bitrate of the media content at the first bitrate,
the second wireless network provides a second quality of service, that is lower than the first quality of service, to the user device based on maintaining the bitrate of the media content at the second bitrate, and
the first wireless network provides provide a third quality of service, that is greater than the first quality of service, after increasing the bitrate of the media content above the first bitrate.

6. The method of claim 1, comprising:
determining that the user device is streaming the media content from a content streaming service; and
based on determining that the user device is streaming the media content from the content streaming service, storing a portion of the media content at a network access point of the second wireless network.

7. A server, comprising:
one or more processors; and
memory including a plurality of computer-executable components that are executable by the one or more processors to perform a plurality of actions, the plurality of actions comprising:
determining that a user device that is communicating with a first wireless network, streaming media content at a first bitrate, buffering the media content in a buffer of a first size, and outputting the media content at a first resolution will transition to a second wireless network;
determining that the second wireless network is configured to stream the media content at a second bitrate that allows the user device to output the media content at a second resolution;
determining that the first bitrate is greater than the second bitrate;
based on determining that the first bitrate is greater than the second bitrate and while the user device is communicating with the first wireless network and outputting the media content at the first resolution, increasing a bitrate of the media content above the first bitrate and outputting a first instruction to increase the buffer to a second size that is greater than the first size; and
after the user device ceases to communicate with the first wireless network and begins to communicate with the second wireless network and while the user device continues to output the media content at the first resolution for a period of time, adjusting the bitrate of the media content to the second bitrate and outputting a second instruction to decrease the buffer to a third size that is less than the first size.

8. The server of claim 7, wherein determining that the user device that is communicating with the first wireless network, streaming the media content at a first bitrate, buffering the media content in the buffer of the first size, and outputting the media content at the first resolution will transition to the second wireless network is based on a movement pattern of the user device.

9. The server of claim 7, comprising:
based on determining that the first bitrate is greater than the second bitrate, increasing a wireless communication bandwidth that the first wireless network allocates to the user device.

10. The server of claim 7, wherein the actions comprise:
before determining that the user device that is communicating with the first wireless network, streaming media content at the first bitrate, buffering the media content in the buffer of the first size, and outputting the media content at the first resolution will transition to the second wireless network, maintaining the bitrate of the media content at the first bitrate.

11. The server of claim 7, wherein:
the first wireless network provides a first quality of service to the user device based on maintaining the bitrate of the media content at the first bitrate,
the second wireless network provides a second quality of service, that is lower than the first quality of service, to the user device based on maintaining the bitrate of the media content at the second bitrate, and
the first wireless network provides provide a third quality of service, that is greater than the first quality of service, after increasing the bitrate of the media content above the first bitrate.

12. The server of claim 7, wherein the actions comprise:
determining that the user device is streaming the media content from a content streaming service; and
based on determining that the user device is streaming the media content from the content streaming service, storing a portion of the media content at a network access point of the second wireless network.

13. One or more non-transitory computer-readable media of a computing device storing computer-executable instructions that upon execution cause one or more processors to perform acts comprising:
determining that a user device that is communicating with a first wireless network, streaming media content at a first bitrate, buffering the media content in a buffer of a first size, and outputting the media content at a first resolution will transition to a second wireless network;

determining that the second wireless network is configured to stream the media content at a second bitrate that allows the user device to output the media content at a second resolution;

determining that the first bitrate is greater than the second bitrate;

based on determining that the first bitrate is greater than the second bitrate and while the user device is communicating with the first wireless network and outputting the media content at the first resolution, increasing a bitrate of the media content above the first bitrate and outputting a first instruction to increase the buffer to a second size that is greater than the first size; and after the user device ceases to communicate with the first wireless network and begins to communicate with the second wireless network and while the user device continues to output the media content at the first resolution for a period of time, adjusting the bitrate of the media content to the second bitrate and outputting a second instruction to decrease the buffer to a third size that is less than the first size.

14. The media of claim 13, wherein determining that the user device that is communicating with the first wireless network, streaming the media content at a first bitrate, buffering the media content in the buffer of the first size, and outputting the media content at the first resolution will transition to the second wireless network is based on a movement pattern of the user device.

15. The media of claim 13, comprising:

based on determining that the first bitrate is greater than the second bitrate, increasing a wireless communication bandwidth that the first wireless network allocates to the user device.

16. The method of claim 1, wherein the user device outputs the media content at a second resolution that is lower than the first resolution after the period of time and while the bitrate of the media content is the second bitrate.

* * * * *